United States Patent [19]

Snorgrass et al.

[11] Patent Number: 4,960,076
[45] Date of Patent: Oct. 2, 1990

[54] MECHANICAL ROPING CALF

[75] Inventors: Patrick R. Snorgrass, Tipton; Gary K. Martin, California, both of Mo.

[73] Assignees: Rope-O-Matic Systems Inc., California, Mo.;

[21] Appl. No.: 371,068

[22] Filed: Jun. 26, 1989

[51] Int. Cl.$^5$ .............................................. A01K 15/02
[52] U.S. Cl. ...................................... 119/29; 273/368
[58] Field of Search .......................... 119/29; 434/247; 273/338, 339, 359, 366, 367, 368

[56] References Cited

U.S. PATENT DOCUMENTS

| | | | |
|---|---|---|---|
| 3,303,821 | 2/1967 | Harris | 119/29 |
| 3,324,832 | 6/1967 | McCain | 119/29 |
| 3,406,969 | 10/1968 | Tisdell et al. | 119/29 |
| 3,711,098 | 1/1973 | McCord | 273/105.2 |
| 3,776,553 | 12/1973 | Keltow | 273/339 |
| 3,802,706 | 4/1974 | Hamm | 273/105.2 |
| 3,947,033 | 3/1976 | Bennett | 273/105.2 |
| 3,962,995 | 6/1976 | Brinson | 119/29 |
| 4,266,779 | 5/1981 | English | 119/29 X |
| 4,451,045 | 5/1984 | Fesmire | 273/338 |

*Primary Examiner*—Gene Mancene
*Assistant Examiner*—R. Thomas Price
*Attorney, Agent, or Firm*—Fleit, Jacobson, Cohn, Price, Holman & Stern

[57] ABSTRACT

A simulated calf body is provided with a forward head and front-to-rear swinging rear legs. The body is guidingly supported for movement along a predetermined path and includes forward ground engaging support and drive wheel structure driven by a motor supported from the body, the motor also being drivingly connected to the rear legs for front-to-rear swinging thereof. The drive connection between the rear legs and the motor and the head each include motor control structure for terminating operation of the motor in the event a rope loop is properly placed about the head or engaged about the rear legs and has a rearward pull exerted thereon.

15 Claims, 2 Drawing Sheets

MECHANICAL ROPING CALF

BACKGROUND OF THE INVENTION

1. Field of the Invention

This invention relates to a simulated calf body including a forward head and depending rear legs, the simulated calf body being mounted for movement along a predetermined path over a selected ground surface and motor driven for movement along the aforementioned path. The rear legs are mounted for oscillation about a horizontal transverse axis for movement between forwardly and downwardly inclined positions and rearwardly and downwardly inclined positions and the head of the calf has rope loop sensing structure thereon to sense the existence of a rope loop engaged therewith and drive structure is provided for driving the rear legs back and forth between their limits of oscillation as the simulated calf body moves along its predetermined path of movement, the drive structure including a yieldable drive connection with the rear legs such that a rearward pull on the lower ends of the legs may swing the latter rearwardly relative to the driven positions thereof and including second sensing structure for sensing rearward movement of the lower ends of the legs from the driven position thereof. The two sensing structures each are operatively associated with the drive motor for terminating operation thereof in a manner such that the sensing of a rope loop engaged about the head of the simulated calf body or a rearward pull on a rope loop engaged about the lower ends of the legs of the calf body will be sufficient to terminate operation of the drive motor.

2. Description of Related Art

Various different forms of mechanical roping calves heretofore have been provided such as those disclosed in U.S. Pat. Nos. 3,711,098, 3,802,706, 3,947,033, 3,962,995 and 4,451,045. However, these previously known forms of mechanical roping calves do not include the overall combination of structural features or the operative association therebetween included in the instant invention.

SUMMARY OF THE INVENTION

The mechanical roping calf of the instant invention includes oscillatably supported rear legs and a depending front support from which a ground engageable drive wheel is rotatably journalled. An electric motor is drivingly connected to the drive wheel and also to the rear legs for oscillating the latter between forwardly and downwardly inclined positions and rearwardly and downwardly inclined positions and the mechanical roping calf is mounted from one end of a horizontal boom having its other end supported from a mount journalled for rotation about a vertical axis relative to a ground support.

The support of the mechanical roping calf from the other or outer end of the boom is such that a major portion of the weight of the mechanical calf is carried by the single drive wheel thereof in order to ensure ample traction between the drive wheel and the ground from which the drive wheel is supported. In addition, the mechanical roping calf includes additional features which enable the operation of the drive motor thereof to be terminated responsive to a rope loop being engaged about the head of the mechanical calf or a rearward pull on a rope loop engaged about the lower ends of the rear legs of the mechanical roping calf.

The main object of this invention is to provide a mechanical roping calf which may be utilized effectively for practicing "heading" and "heeling".

Another object of this invention is to provide a mechanical roping calf in accordance with the preceding objects and including a ground engageable drive wheel which supports a major portion of the weight of the mechanical roping calf body in order to ensure ample traction between the drive wheel and the ground surface from which the drive wheel is supported.

Another very important object of this invention is to provide a mechanical roping calf including a drive system therefor which may be rendered inoperatively responsive to a rope loop being properly looped about the head of the mechanical roping calf body.

A further object of this invention, in accordance with the immediately preceding object, is to provide a mechanical roping calf whose drive system also may be rendered inoperatively responsive to a rearward pull being applied to the lower ends of the rear legs of the mechanical roping calf.

Still another important object of this invention is to provide a mechanical roping calf including a pair of laterally spaced, opposite side depending rear legs mounted from an associated simulated calf body for oscillation of the legs between generally vertical positions and downwardly convergent positions with the legs being yieldingly biased toward their vertical positions.

A final object of this invention to be specifically enumerated herein is to provide a mechanical roping calf in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
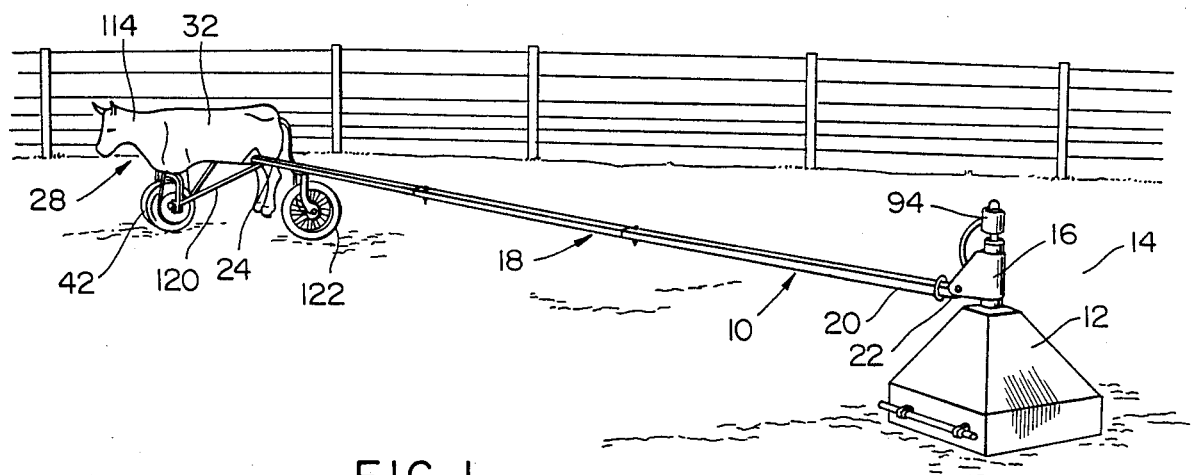
FIG. 1 is a perspective view of the mechanical roping calf assembly of the instant invention.
Figure 2:
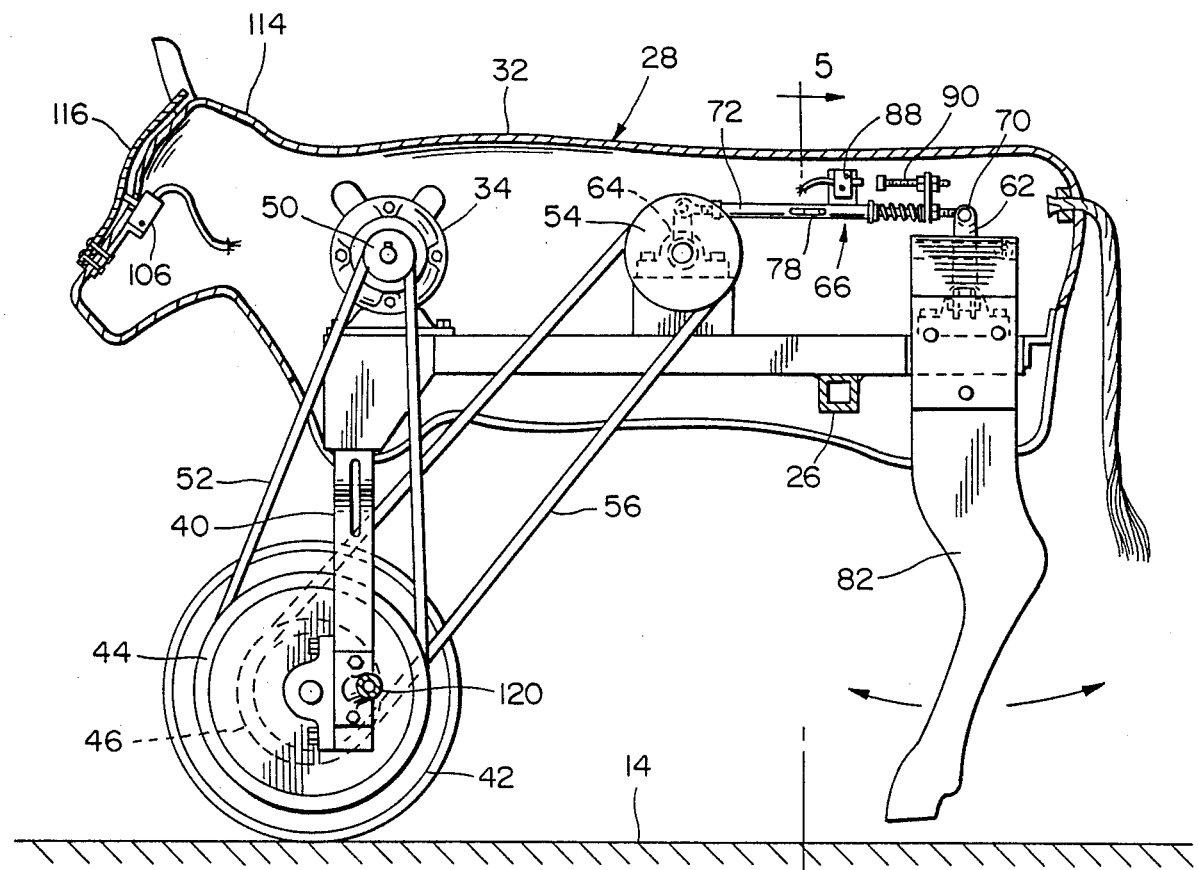
FIG. 2 is an enlarged longitudinal vertical sectional view of the simulated roping calf illustrating the drive components thereof and the manner in which the rear legs may be oscillated between forwardly and downwardly inclined positions and rearwardly and downwardly inclined positions.

Referring now more specifically to the drawings, the numeral 10 generally designates the mechanical roping calf assembly of the instant invention. The assembly 10 includes a center support 12 stationarily mounted relative to a predetermined ground area 14 and a mount 16 is journalled from the upper portion of the support 12 for rotation about a vertical axis.

An elongated horizontal boom 18 is provided and one end 20 of the boom 18 is anchored relative to the mount 16 as at 22. The other or second end 24 of the boom 18 is removably anchored relative to a horizontally outwardly projecting arm 26 of a horizontally elongated, simulated standing calf referred to in general by the reference numeral 28. The calf 28 includes a horizontal frame 30 relative to which the arm 26 is secured and a body 32 removably secured over the frame 30.

The frame 30 is horizontally elongated and supports an electric motor 34 from its front end, rotatably journals a crankshaft 36 from its longitudinal mid-portion and oscillatably supports a crankshaft 38 from its rear end portion.

The forward end of the frame 30 includes a depending inverted, generally U-shaped support from whose lower end a combined support and drive wheel 42 is journalled. The support and drive wheel includes large and small diameter torque input and torque output pulleys 44 and 46 rotatable therewith and the motor 34 includes an output shaft 48 having a small diameter pulley 50 mounted thereon aligned with the pulley 44, an endless belt 52 being trained about the pulleys 50 and 44.

The crankshaft 36 has a pulley 54 mounted on one end thereof aligned with the pulley 46 and an endless belt 56 is trained about the pulleys 54 and 46. In this manner, the electric motor 34 not only drives the support and drive wheel 42 by the belt 52, but also drives the crankshaft 36 by the belt 56.

The crankshaft 38 is oscillatably supported from pillow blocks 60 supported from the rear of the frame 30 and includes an upstanding lever arm 62 aligned with a crank arm 64 mounted on the end of the crankshaft 36 remote from the pulley 54. An adjustable length connecting rod assembly referred to in general by the reference numeral 66 has one end thereof rotatably supported from the free end of the crank arm 64 as at 68 and the other (rear) end of the crank arm assembly 66 is pivotally secured as at 70 to the free upper end of the lever arm 62.

Figure 6:
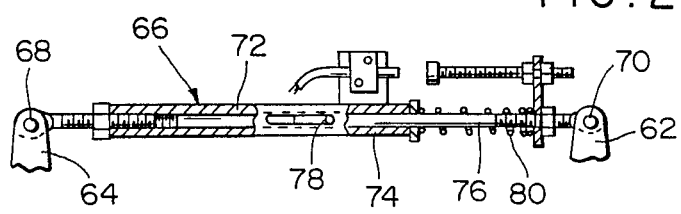
FIG. 6 is an enlarged fragmentary vertical sectional view illustrating the motion drive connection between the crankshaft of the drive assembly and the rear legs of the mechanical roping calf.

As may be seen from FIG. 6 of the drawings, the connecting rod assembly 66 includes an adjustable length forward end portion 72 defining a rearwardly opening sleeve 74 and a rear end portion 76 telescopingly engaged in the sleeve 74 and enjoying a pin and slot connection 78 therewith, a compression spring 80 being disposed about the rear end portion 76 and operatively associated with the front and rear end portions 72 and 76 to yieldingly bias the connecting rod assembly 66 to its extended limit position, the pin and slot connection 78 and the spring 80 enabling the rear end portion 76 to shift forwardly against the biasing action of the spring 80 relative to the front end portion 72 and thus defining a lost motion drive connection between the crank arm 64 and the lever arm 70.

The opposite ends of the crankshaft 38 have the upper ends of a pair of depending simulated legs 82 pivotally supported therefrom as at 84 and an expansion spring 86 is operatively connected between upper end portions of the legs 82 above their pivot connections 84 with the crankshaft 38. The effective length of the expansion spring 86 is adjustable such that the legs 82 normally assume substantially vertical positions, but the lower ends of the legs 82 may be swung inwardly toward each other upon the tightening of a rope loop thereabout.

The front end portion 72 of the connecting rod assembly 66 supports a pushbutton switch 88 therefrom and an adjustable abutment 90 is supported from the rear end portion 76 of the connecting rod assembly 66 and is engageable with the pushbutton switch 80 to open the latter for a purpose to be hereinafter more fully set forth.

Figure 8:
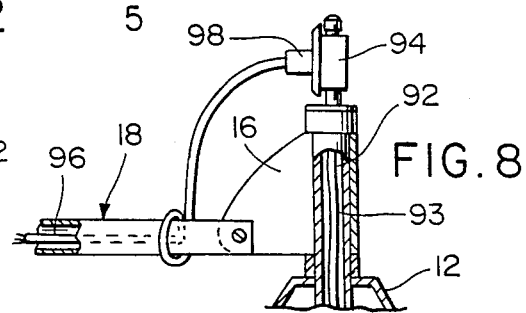
FIG. 8 is an enlarged fragmentary elevational view illustrating the manner in which the inner end of the boom for the simulated calf body is rotatably mounted from a ground support.
Figure 3:
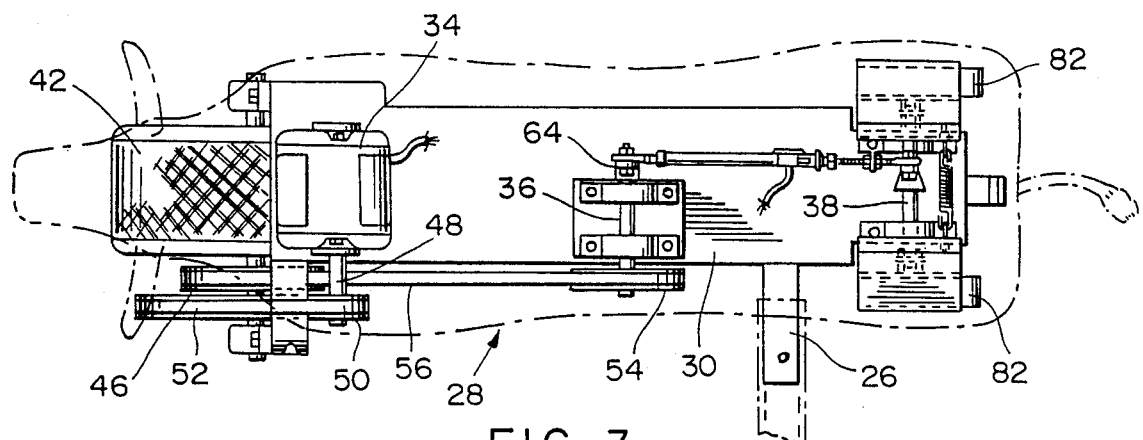
FIG. 3 is a top plan view of the assemblage illustrated in FIG. 1 with the outer shell of the simulated calf body illustrated in phantom lines only.
Figure 4:
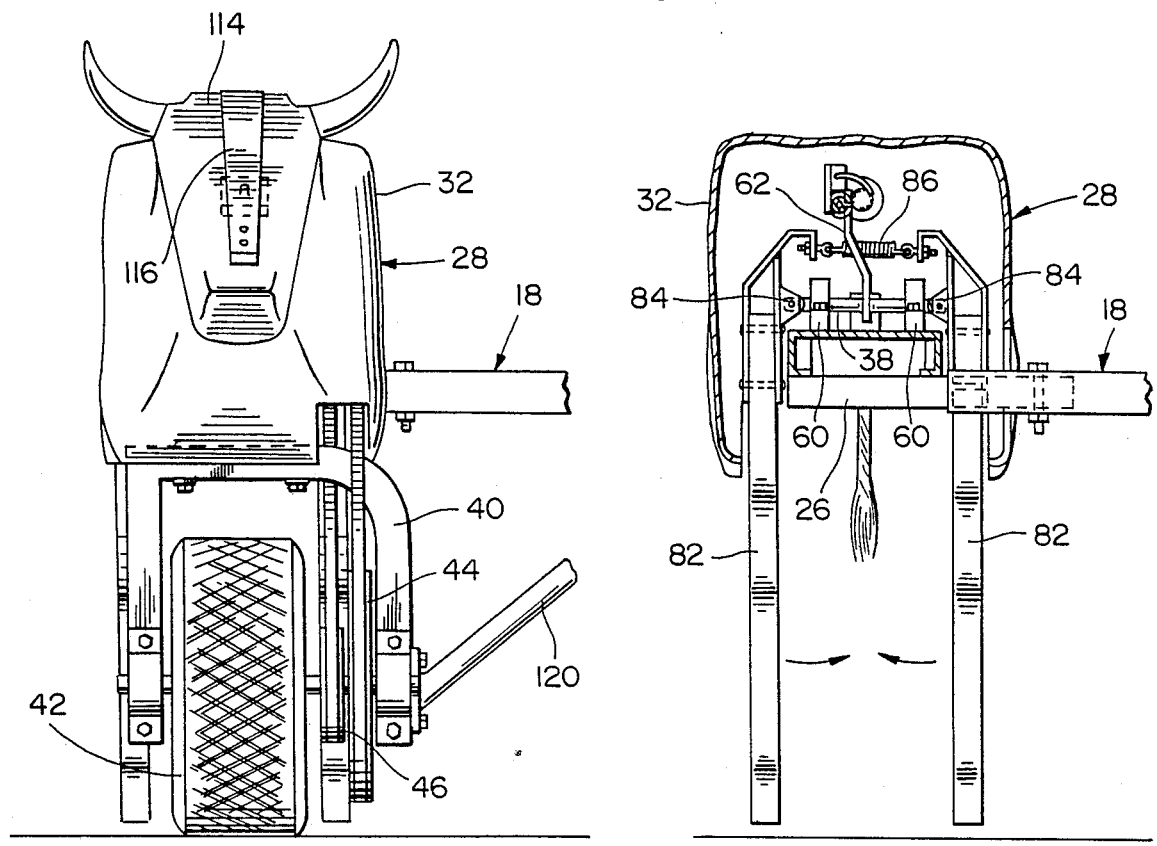
FIG. 4 is a fragmentary front elevational view of the assemblage illustrated in FIG. 2.
Figure 5:
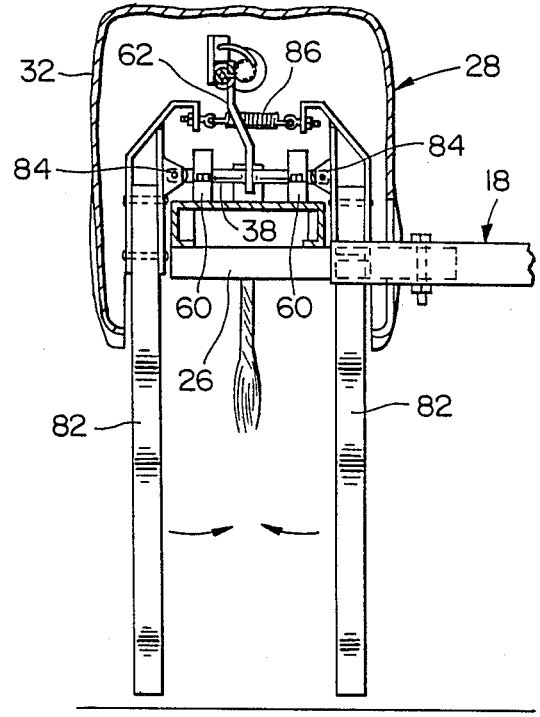
FIG. 5 is a vertical sectional view taken substantially upon the plane indicated by the section line 5—5 of FIG. 2.
Figure 7:
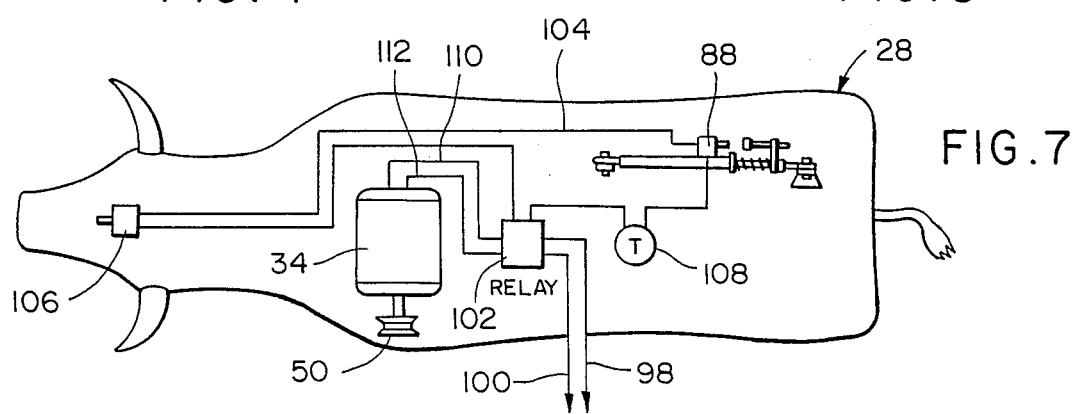
FIG. 7 is a schematic view illustrating the writing circuitry for the mechanical roping calf.

With attention now invited more specifically to FIG. 8 of the drawings, it may be seen that the support 12 is hollow and that the mount 16 defines a passage 92 extending upwardly therethrough through which an electrical cord 93 extends. An electrical junction box 94 is supported stationary relative to the support 12 and the electrical cord 93 is electrically connected with the junction box 94, the boom 18 being tubular and having a second electrical cord 96 extending therethrough provided with a plug 98 on one end removably electrically connecting the electrical cord 96 with the electrical cord 93 through the junction box 94. The end of the electrical cord 96 remote from the plug 98 includes two conductors 98 and 100 electrically connected to a relay 102. A first loop circuit 104 has the switch 88 and a second switch 106 serially connected therein as well as an adjustable timer 108 and is connected to the relay 102. When the switches 88 and 106 are closed, the relay 102 electrically connects the conductors 98 and 100 to the electric motor 34 by conductors 110 and 112. The switch 106 is mounted within the head 114 of the body 32 and the head 114 includes a leaf spring-type actuator 116 supported therefrom for deflection by a rope loop (not shown) when such a rope loop is disposed about the head 114 in a predetermined manner. When the actuator 116 is momentarily deflected by a rope loop about the head 114, the switch 106 is opened terminating operation of the motor 34 and initiating timer operation of the timer 108 to maintain the motor 34 inoperative for a predetermined time interval. Also, if the lower ends of the legs 82 are roped and pulled rearwardly, the abutment 90 (an actuator for the switch 88) opens the switch 88 and also terminates operation of the motor 34 and initiates operation of the timer to maintain the motor 34 inoperative for a predetermined time interval.

An inclined brace 120 is secured between the support 40 and the boom 18 and the boom 18, a space distance outward from the body 32, includes a ground engageable support wheel 122 mounted for rotation about a horizontal axis disposed in a vertical plane spaced rearward of the boom 18. Further, the end of the boom 18 remote from the mount 16 is anchored relative to a rear portion of the frame 30 and, therefore, a major portion of the weight of the calf 28 and the outer end portion of the boom 18 is transferred to the support and drive wheel 42. The spacing of the axis of rotation of the wheel 122 rearward of a vertical plane containing the boom 18 transfers a greater portion of the weight of the boom 18 to the support and drive wheel 42. Thus, the support and drive wheel 42 enjoys considerable traction engagement with the ground area 14, the calf 28 moving along a circular path in whose center the support 12 is disposed.

In operation, the electrical cord 93 may have its end remote from the junction box 94 electrically connected with a suitable source of electrical potential (not shown) through the utilization of a conventional on and off switch (not shown). As a result of the motor thus being connected to a suitable source of electrical potential, the support and drive wheel 42 is driven from the pulley 50 through the belt 52 causing the calf 28 to move about its predetermined circular path. Operation of the calf 28 continues until the electrical circuit providing current to the motor 34 is interrupted.

A person practicing "heading" may then attempt to throw a rope loop in proper position about the head 114. If the rope loop is properly engaged about the head 114, the actuator 116 is deflected, at least momentarily, to open the switch 106. As soon as the switch 106 is opened, the timer maintains the circuit to the motor 34 open for a predetermined (adjustable) length of time. The predetermined time of inoperation of the motor 34 enables a person practicing "heading" sufficient time to remove his rope loop from the head 14 and to return his rope to a properly coiled position in readiness for the next operation of the calf 28.

If, on the other hand, a person is practicing "heeling", after operation of the calf 28 has been initiated and the calf 28 is moving about its predetermined circular path of movement with the rear legs 82 being swung back and forth between forwardly and downwardly inclined positions and rearwardly and downwardly inclined positions, the person practicing "heeling" attempts to throw the loop of his rope about the lower portion of the legs 82. If the practicing person is successful, he may then exert a rearward pull on the legs 82 to cause the lever arm 62 to swing forwardly (relative to the driven position thereof by the connecting rod assembly 66) resulting in engagement of the abutment (actuator) 90 with the switch 88 and causing the switch 88 to be at least momentarily opened to interrupt the flow of current to the motor 34, thereby initiating operation of the timer 108 to maintain the circuit to the motor 34 open for a predetermined length of time. During this predetermined length of time the person practicing "heeling" may "flip" his rope in order to loosen the loop thereof about the legs 82 and allow the loop to fall downwardly from the bottom of the legs 82.

It is pointed out that when the practicing person's rope has a rearward pull exerted thereon in order to cause the switch 88 to be at least momentarily opened, the lower end portions of the legs 82 swing toward each other against the biasing action of the expansion spring 86. Therefore, the legs 82 are downwardly convergent and "flipping" the rope will allow the loop thereof to loosen sufficiently and fall from the lower ends of the legs 82. Here again, operation of the motor 34 is terminated for a sufficient length of time in order to enable the practicing person to remove his rope from the calf 28 and to recoil his rope for further practicing with the calf 28.

From FIG. 1 of the drawings it may be seen that the boom 18 is sectional. Accordingly, the end of the boom adjacent the mount 16 may be readily removed therefrom and the individual boom sections may be disconnected from each other, after which the boom section adjacent the body 32 may be used to manually move the calf 28 to a storage area, if desired.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A mechanical roping calf assembly for use in practicing "heading" and "heeling", said assembly including a center ground supported support, a mount rotatably supported from said support for angular displacement about a vertical axis, an elongated horizontal boom, first means mounting one end of said boom from said mount for rotation therewith relative to said support, a horizontally elongated simulated standing calf body having a head end and a tail end, means mounting said simulated calf body from the other end of said boom with said boom disposed rearward toward the tail end of said calf body from the longitudinal center thereof, said head end of said calf body including a simulated calf head, said tail end of said calf body including depending leg means, said head end of said body including depending support means, ground engageable support and drive wheel means journalled from a lower portion of said support means, said boom, intermediate the opposite ends thereof and adjacent said body, including dependingly supported ground engageable support wheel means journalled therefrom for rotation about a horizontal axis generally paralleling said boom and spaced rearward of a vertical plane containing said boom, and motor means carried by said calf body assembly drivingly connected to said support and drive wheel means, the placement of said axis rearward of said vertical plane and the mounting of said boom other end to said calf body rearward of the longitudinal center of said calf body serving to increase the driving traction of said support and drive wheel means with a ground surface portion with which said support and drive wheel means is engaged.

2. The assembly of claim 1 including mounting means mounting said bending leg means from said calf body for oscillation relative thereto about a horizontal axis extending transversely of said body adjacent an upper portion of said leg means, whereby said leg means may be swung between forwardly and downwardly inclined positions and rearwardly and downwardly inclined positions.

3. The assembly of claim 2 wherein said leg means includes a pair of laterally spaced, generally parallel opposite side legs.

4. The assembly of claim 3 wherein said mounting means mounts said legs from said body for oscillation relative thereto in unison, said mounting means also mounting said legs from said body for oscillation relative thereto between first and second positions with said legs generally vertical and downwardly divergent, respectively, and means operatively connected between said legs yieldingly biasing said legs toward said first positions.

5. The assembly of claim 2 including drive means drivingly connecting said motor means to said leg means for oscillation of said leg means between said forwardly and downwardly inclined positions and said rearwardly and downwardly inclined positions.

6. The assembly of claim 5 wherein said mounting means mounts said legs from said body for oscillation relative thereto in unison, said mounting means also mounting said legs from said body for oscillation relative thereto between first and second positions with said legs generally vertical and downwardly divergent, respectively, and means operatively connected between said legs yieldingly biasing said legs toward said first positions.

7. The assembly of claim 5 wherein said drive means includes a yieldable connection with said leg means whereby said leg means may be swung rearwardly, at least slightly, relative to the driven position thereof by said motor means.

8. The assembly of claim 7 wherein said motor means includes control means therefor for terminating operation thereof, and actuator means for said control means operative to actuate said control means to terminate operation of said motor means, said drive means being operatively associated with said actuator means to operate said control means responsive to swinging of said leg means rearwardly relative to the driven position thereof.

9. The assembly of claim 8 wherein said control means includes timer means operative to automatically restart said motor means upon termination of a predetermined time interval after initial termination of operation of said motor means by said control means.

10. The assembly of claim 7 wherein said head includes a rope loop sensing means thereon operative to sense a rope loop in predetermined position about said head, said motor means including control means therefor for terminating operation thereof and actuator means for said control means operative to actuate said control means to terminate operation of said motor means, said drive means being operatively associated with said actuator means to operate said control means responsive to swinging of said leg means rearwardly relative to the driven position thereof, said control means also including second actuator means therefor operatively associated with said rope loop sensing means for operating said control means to terminate operation of said motor means responsive to said rope sensing means sensing a rope loop in proper position about said head.

11. The assembly of claim 10 wherein said control means includes timer means operative to automatically restart said motor means upon termination of a predetermined time interval after initial termination of operation of said motor means by said control means.

12. A mechanical roping calf assembly for use in practicing "heading" and "heeling", said assembly including a center ground supported support, a mount rotatably supported from said support for angular displacement about a vertical axis, an elongated horizontal boom, first means mounting one end of said boom from said mount for rotation therewith relative to said support, a horizontally elongated simulated standing calf body having a head end and a tail end, means mounting said simulated calf body from the other end of said boom, said head end of said calf body including a simulated calf head, said tail end of said calf body including depending leg means, said head end of said body including depending support means, ground engageable support and drive wheel means journalled from a lower portion of said support means, and motor means carried by said calf body drivingly connected to said support and drive wheel means, mounting means mounting said depending leg means from said calf body for oscillation relative thereto about a horizontal axis extending transversely of said body adjacent an upper portion of said leg means, whereby said leg means may be swung between forwardly and downwardly inclined positions and rearwardly and downwardly inclined positions, drive means drivingly connecting said motor means to said leg means for oscillating said leg means between said forward and downwardly inclined positions and rearward and downwardly inclined positions, said drive means including a yieldable connection with said leg means whereby said leg means may be swung rearwardly, at least slightly, relative to the driven position thereof by said motor means, said motor means including control means therefor for terminating operation thereof, and actuator means for said control means operative to actuate said control means to terminate operation of said motor means, said drive means being operatively associated with said actuator means to operate said control means responsive to swinging of said leg means rearwardly relative to the driven position thereof.

13. The assembly of claim 12 wherein said control means includes timer means operative to automatically restart said motor means upon termination of a predetermined time interval after initial termination of operation of said motor means by said control means.

14. The assembly of claim 12 wherein said head includes a rope loop sensing means thereon operative to sense a rope loop in predetermined position about said head, said control means also including second actuator means therefor operatively associated with said rope loop sensing means for operating said control means to terminate operation of said motor means responsive to said rope sensing means sensing a rope loop in proper position about said head.

15. The assembly of claim 14 wherein said control means includes timer means operative to automatically restart said motor means upon termination of a predetermined time interval after initial termination of operation of said motor means by said control means.

* * * * *